United States Patent
Park et al.

(10) Patent No.: US 12,351,979 B2
(45) Date of Patent: Jul. 8, 2025

(54) STEEL CORD FOR TIRE BELT PLY REINFORCEMENT

(71) Applicant: Hongduk Industrial Co., Ltd., Pohang-si (KR)

(72) Inventors: Pyeong Yeol Park, Daejeon (KR); Gi Hwan Kim, Pohang-si (KR)

(73) Assignee: Hongduk Industrial Co., Ltd., Pohang-si (KR)

(*) Notice: Subject to any disclaimer, the term of this patent is extended or adjusted under 35 U.S.C. 154(b) by 25 days.

(21) Appl. No.: 18/562,493

(22) PCT Filed: May 10, 2022

(86) PCT No.: PCT/KR2022/006615
§ 371 (c)(1),
(2) Date: Nov. 20, 2023

(87) PCT Pub. No.: WO2022/245033
PCT Pub. Date: Nov. 24, 2022

(65) Prior Publication Data
US 2024/0239140 A1    Jul. 18, 2024

(30) Foreign Application Priority Data

May 20, 2021    (KR) .......................... 10-2021-0064482

(51) Int. Cl.
*D07B 1/06*    (2006.01)
*B60C 9/00*    (2006.01)
*D07B 5/00*    (2006.01)

(52) U.S. Cl.
CPC ............ *D07B 1/062* (2013.01); *B60C 9/0007* (2013.01); *D07B 5/007* (2013.01);
(Continued)

(58) Field of Classification Search
CPC ...... B60C 9/0007; D07B 1/062; D07B 5/007; D07B 2201/2019
See application file for complete search history.

(56) References Cited

U.S. PATENT DOCUMENTS

| | | | |
|---|---|---|---|
| 2010/0005774 A1* | 1/2010 | Fukuda | D07B 1/062 57/215 |
| 2016/0144663 A1 | 5/2016 | Lee et al. | |

(Continued)

FOREIGN PATENT DOCUMENTS

| | | | |
|---|---|---|---|
| EP | 0264071 A2 * | 4/1988 | B60C 9/20 |
| EP | 2 801 659 A | 11/2014 | |

(Continued)

OTHER PUBLICATIONS

Translation of KR 20020055202.*
(Continued)

*Primary Examiner* — Shaun R Hurley
(74) *Attorney, Agent, or Firm* — McCarter & English, LLP

(57) ABSTRACT

A steel cord for tire belt ply reinforcement includes a cord formed by periodically twisting n wires, wherein the n wires are compressed by rolling, and at least one of the n wires is compressed into a non-circular shape, when n is an odd number, a cross-section of one wire from among the n wires is circular due to rolling, and cross-sections of n−1 wires from among the n wires are non-circular, and when n is an even number, cross-sections of two wires from among the n wires are circular due to rolling, and cross-sections of n−2 wires from among the n wires are non-circular due to rolling.

3 Claims, 8 Drawing Sheets

(52) U.S. Cl.
CPC .............. *B60C 2009/0085* (2013.01); *D07B 2201/2019* (2013.01); *D07B 2205/3025* (2013.01); *D07B 2501/2046* (2013.01)

(56) References Cited

U.S. PATENT DOCUMENTS

2019/0263180 A1    8/2019  Sherhag et al.
2020/0282777 A1*   9/2020  Liu .................... B60C 15/04

FOREIGN PATENT DOCUMENTS

| JP | 2007-92259 A | | 4/2007 | |
|---|---|---|---|---|
| KR | 2002-0003620 A | | 1/2002 | |
| KR | 20020055202 A | * | 7/2002 | ........... D07B 1/0646 |
| KR | 10-2010-0006070 A | | 1/2010 | |
| KR | 10-2016-0043856 A | | 4/2016 | |
| WO | WO-2015008996 A1 | * | 1/2015 | ............. B29D 30/08 |

OTHER PUBLICATIONS

Translation of EP 0264071.*
International Search Report and Written Opinion prepared for International Application PCT/KR2022/006615 by the Korean Intellectual Property Office, acting as the International Searching Authority, dated Aug. 10, 2022 with English translation of International Search Report.
Supplementary European Search Report, issued by European Patent Office for corresponding European Patent Application No. 22804888.0, dated Feb. 27, 2025.

* cited by examiner

FIG. 5

| | COMPARATIVE EXAMPLE 1 | COMPARATIVE EXAMPLE 2 | COMPARATIVE EXAMPLE 3 | EMBODIMENT 1 | EMBODIMENT 2 | EMBODIMENT 3 |
|---|---|---|---|---|---|---|
| STRUCTURE | 1x5x0.28SHT | 1x5x0.28SHT | 1x5x0.28SHT | 1x5x0.28SHT | 1x5x0.28SHT | 1x5x0.28SHT |
| SHAPE | | | | | | |
| d2/d1 | 1.00 | 0.65 | 1.00 | 0.75 | 0.85 | 0.95 |
| DIAMETER OF CIRCULAR WIRE(d1) (mm) | 0.280 | 0.280 | 0.280 | 0.280 | 0.280 | 0.280 |
| MINOR AXIS OF NON-CIRCULAR WIRE(d2) (mm) | 0.280 | 0.182 | 0.280 | 0.210 | 0.238 | 0.266 |
| DIAMETER OF STEEL CORD (mm) | 0.75 | major axis:1.00 minor axis:0.50 | major axis:0.80 minor axis:0.73 | major axis:0.97 minor axis:0.53 | major axis:0.93 minor axis:0.61 | major axis:0.88 minor axis:0.69 |
| DICING FORCE (kgf) | 114 | 96 | 110 | 101 | 104 | 106 |
| STIFFNESS COEFFICIENT (N·mm²) | 330 | major axis:423 minor axis:255 | major axis:335 minor axis:325 | major axis:407 minor axis:283 | major axis:372 minor axis:300 | major axis:346 minor axis:320 |
| INITIAL ADHESION STRENGTH (%) (n=10) | AVERAGE 100(STANDARD) EACH 94~104 | AVERAGE 104 EACH 96~108 | AVERAGE 102 EACH 94~106 | AVERAGE 106 EACH 101~108 | AVERAGE 108 EACH 103~110 | AVERAGE 108 EACH 103~111 |
| FATIGUE CYCLE (%) (n=10) | AVERAGE 100(STANDARD) EACH 89~110 | AVERAGE 105 EACH 96~120 | AVERAGE 108 EACH 100~112 | AVERAGE 113 EACH 108~120 | AVERAGE 115 EACH 108~122 | AVERAGE 113 EACH 102~120 |

FIG. 8

| STRUCTURE | COMPARATIVE EXAMPLE 1 | COMPARATIVE EXAMPLE 2 | COMPARATIVE EXAMPLE 3 | EMBODIMENT 1 | EMBODIMENT 2 | EMBODIMENT 3 |
|---|---|---|---|---|---|---|
| | 1x6x0.28SHT | 1x6x0.28SHT | 1x6x0.28SHT | 1x6x0.28SHT | 1x6x0.28SHT | 1x6x0.28SHT |
| SHAPE | | | | | | |
| d2/d1 | 1.00 | 0.65 | 1.00 | 0.75 | 0.85 | 0.95 |
| DIAMETER OF CIRCULAR WIRE(d1) (mm) | 0.280 | 0.280 | 0.280 | 0.280 | 0.280 | 0.280 |
| MINOR AXIS OF NON-CIRCULAR WIRE(d2) (mm) | 0.280 | 0.182 | 0.280 | 0.210 | 0.238 | 0.266 |
| DIAMETER OF STEEL CORD (mm) | 0.84 | major axis:1.12 minor axis:0.56 | major axis:0.89 minor axis:0.82 | major axis:1.08 minor axis:0.60 | major axis:1.04 minor axis:0.69 | major axis:0.98 minor axis:0.76 |
| DICING FORCE (kgf) | 137 | 115 | 133 | 122 | 126 | 127 |
| STIFFNESS COEFFICIENT (N·mm²) | 330 | major axis:487 minor axis:294 | major axis:386 minor axis:374 | major axis:469 minor axis:326 | major axis:428 minor axis:345 | major axis:398 minor axis:368 |
| INITIAL ADHESION STRENGTH (%) | AVERAGE 100(STANDARD) EACH 92~108 | AVERAGE 106 EACH 95~113 | AVERAGE 102 EACH 90~108 | AVERAGE 108 EACH 102~115 | AVERAGE 108 EACH 103~115 | AVERAGE 107 EACH 101~116 |
| FATIGUE CYCLE (%) | AVERAGE 100(STANDARD) EACH 87~110 | AVERAGE 106 EACH 92~118 | AVERAGE 102 EACH 96~112 | AVERAGE 112 EACH 108~122 | AVERAGE 118 EACH 111~124 | AVERAGE 113 EACH 106~120 |

FIG. 11

| | | COMPARATIVE EXAMPLE 1 | COMPARATIVE EXAMPLE 2 | EMBODIMENT 1 | EMBODIMENT 2 |
|---|---|---|---|---|---|
| STRUCTURE | | 1x5x0.28HT | 1x6x0.28HT | 1x5x0.28HT | 1x6x0.28HT |
| | d2/d1 | 1.00 | 1.00 | 0.85 | 0.85 |
| RIGHT AFTER MANUFACTURING | Average | 10 | 12 | 10 | 11 |
| | Min. | 8 | 8 | 7 | 8 |
| | Max. | 12 | 16 | 13 | 14 |
| 10DAYS | Average | 40 | 36 | 32 | 30 |
| | Min. | 36 | 30 | 27 | 22 |
| | Max. | 45 | 42 | 40 | 28 |
| 20DAYS | Average | 55 | 48 | 38 | 40 |
| | Min. | 45 | 36 | 34 | 30 |
| | Max. | 62 | 55 | 43 | 50 |
| 30DAYS | Average | 70 | 65 | 72 | 68 |
| | Min. | 55 | 50 | 60 | 60 |
| | Max. | 83 | 77 | 80 | 77 |
| 60DAYS | Average | 72 | 66 | 81 | 72 |
| | Min. | 60 | 48 | 65 | 62 |
| | Max. | 85 | 76 | 98 | 82 |
| 90DAYS | Average | 73 | 72 | 93 | 85 |
| | Min. | 62 | 60 | 70 | 71 |
| | Max. | 80 | 80 | 115 | 100 |
| 120DAYS | Average | 76 | 75 | 100 | 95 |
| | Min. | 61 | 65 | 87 | 80 |
| | Max. | 88 | 85 | 120 | 107 |
| 150DAYS | Average | 73 | 77 | 105 | 100 |
| | Min. | 60 | 70 | 90 | 83 |
| | Max. | 82 | 85 | 123 | 118 |
| 300DAYS | Average | 73 | 75 | 110 | 113 |
| | Min. | 55 | 50 | 98 | 95 |
| | Max. | 91 | 103 | 124 | 127 |

STRAIGHTNESS QUALITY (mm/40cm) (n=5)

STEEL CORD FOR TIRE BELT PLY REINFORCEMENT

CROSS-REFERENCE TO RELATED APPLICATIONS

This application is the National Stage entry under 35 U.S.C. § 371 of International Application Number PCT/KR2022/006615 filed on May 10, 2022, which claims the benefit of priority under 35 U.S.C. § 119 of Korean patent application number 10-2021-0064482 filed May 20, 2021.

TECHNICAL FIELD

One or more embodiments relate to a steel cord for tire belt ply reinforcement, and more particularly to, a steel cord for tire belt ply reinforcement, the steel cord including a cord formed by periodically twisting n wires and rolled to manufacture wires having circular cross-sections and non-circular cross-sections, wherein the number of wires having circular cross-sections varies with the number of wires.

BACKGROUND ART

Among various types of reinforcement materials used for reinforcing various types of rubber products including vehicle tires and industrial belts, steel cords for tire reinforcement have excellent properties, such as strength, modulus, heat resistance, fatigue resistance, rubber adhesion, or the like. Steel cords, as a material satisfying the functionality required for tires, are widely used for tire reinforcing according to the properties thereof, and usage thereof has constantly increased.

As the regulations on $CO_2$ emissions have been strengthened, the conversion to electric vehicles is rapidly progressing recently. In the case of an electric vehicle, because the energy consumption due to the rolling resistance of tires is high, the development of a steel cord for reducing the rolling resistance of the tires is needed.

In addition, it is required to increase a lifespan of a tire to reduce $CO_2$ emissions, and accordingly, a steel cord capable of improving properties, such as durability, fatigue resistance, or the like, of a tire is required.

DESCRIPTION OF EMBODIMENTS

Technical Problem

One or more embodiments relate to a steel cord for tire belt ply reinforcement, and more particularly to, a steel cord for tire belt ply reinforcement, the steel cord including a cord formed by periodically twisting n wires and rolled to manufacture wires having circular cross-sections and non-circular cross-sections, wherein the number of wires having circular cross-sections varies with the number of wires.

Solution to Problem

Additional aspects will be set forth in part in the description which follows and, in part, will be apparent from the description, or may be learned by practice of the presented embodiments of the disclosure.

According to one or more embodiments, a steel cord for tire belt ply reinforcement includes a cord formed by periodically twisting n wires, wherein the n wires are compressed by rolling, and at least one of the n wires is compressed into a non-circular shape, when n is an odd number, a cross-section of one wire from among the n wires is circular due to the rolling, and cross-sections of n−1 wires from among the n wires are non-circular, and when n is an even number, cross-sections of two wires from among the n wires are circular due to the rolling, and cross-sections of n−2 wires from among the n wires are non-circular due to the rolling.

In the steel cord for tire belt ply reinforcement, when a wire of which a cross-section is circular due to the rolling is referred to as a first wire, a wire of which a cross-section is non-circular due to the rolling is referred to as a second wire, a ratio of a minor axis of the second wire to a diameter of the first wire may be about 0.70 to about 0.98.

The number (n) of the wires of the steel cord may be 3 to 9.

The diameter of the first wire of the steel cord may be about 0.1 mm to about 0.6 mm.

In the steel cord for tire belt ply reinforcement, when a diameter of the wires before the rolling is referred to as d (mm), a first strength (normal tensile, NT) may be defined as 3,200−2,000×d (mm)+200 (MPa), a second strength (high tensile, HT) may be defined as 3,500−2,000×d (mm)+200 (MPa), a third strength (super tensile, ST) may be defined as 3,850−2,000×d (mm)+200 (MPa), a fourth strength (ultra tensile, UT) may be defined as 4,200−2,000×d (mm)+200 (MPa), a fifth strength (mega tensile, MT) may be defined as 4,600−2,000×d (mm)+200 (MPa), and a tensile strength of the wires before the rolling may be one of the second strength, the third strength, the fourth strength, and the fifth strength.

In the steel cord for tire belt ply reinforcement, the wires having a tensile strength of an n-th strength before the rolling may be rolled to have a tensile strength of an n−1-th strength.

When an end of the steel cord is fixed to one point when the steel cord of the steel cord for tire belt ply reinforcement is wound on a spool for two months to one year, and when the steel cord is vertically lowered by 400 mm, a distance between a first axis forming a vertical line from the one point and other end of the steel cord may be 40 mm or less.

The cord of the steel cord may be heat-treated at about 100° C. to about 250° C.

Advantageous Effects of Disclosure

The present disclosure relates to a steel cord for tire belt ply reinforcement, and may increase stiffness in a direction of a rotation axis of a tire as the steel cord is manufactured through rolling, thereby improving the durability and fatigue property of the steel cord.

In addition, the present disclosure may prevent a decrease in the durability of the steel cord due to the penetration of moisture or salt by improving the rubber penetrability through rolling, and may improve the initial adhesion strength of a steel cord by improving the rubber penetrability.

In addition, the present disclosure may reduce the thickness of rubber when the steel cord is buried in the rubber sheet, as the steel cord is manufactured through rolling.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 shows, when n is an odd number, conditions of Embodiments 1, 2, and 3, in which a ratio of a minor axis of a second wire to a diameter of a first wire is within a range of about 0.70 to about 0.98, and conditions of Comparative Examples 1, 2, and 3, in which the ratio of the minor axis of the second wire to the diameter of the first wire is out of the range of about 0.70 to about 0.98, according to an embodiment;

FIG. 8 shows, when n is an even number, conditions of Embodiments 1, 2 and 3, in which a ratio of a minor axis of a second wire to a diameter of a first wire is within a range of about 0.70 to about 0.98, and conditions of Comparative Examples 1, 2, and 3, in which the ratio of the minor axis of the second wire to the diameter of the first wire is out of the range of about 0.70 to about 0.98, according to an embodiment;

FIG. 11 shows straightness quality of Embodiments 1, 2, 3, and 4, in which a ratio of a minor axis of a second wire to a diameter of a first wire is within a range of about 0.70 to about 0.98, and straightness quality of Comparative Examples 1 and 2, in which the ratio of the minor axis of the second wire to the diameter of the first wire is out of the range of about 0.70 to about 0.98.

MODE OF DISCLOSURE

Figure 1:
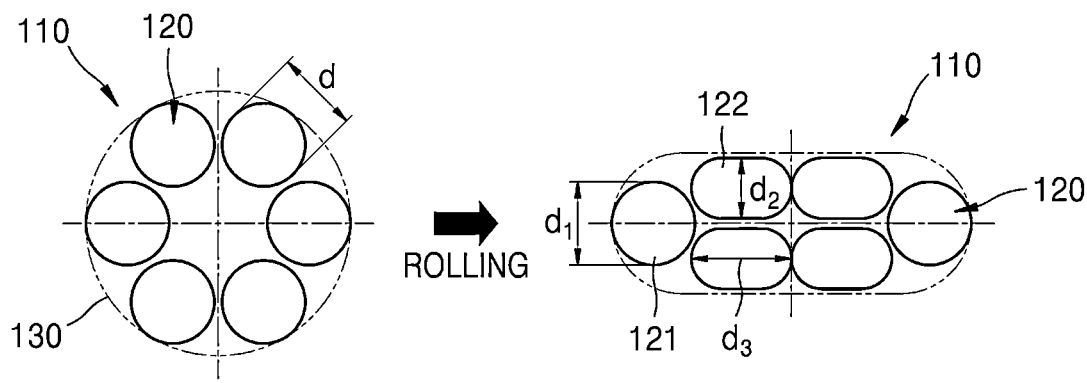
FIG. 1 is a diagram illustrating a steel cord rolled to have two circular cross-sections when n is an even number, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While the principles of the present disclosure has been particularly shown and described with reference to embodiments thereof, it will be understood by those skilled in the art that various changes in form and details may be made therein without departing from the spirit and scope of the inventive concept as defined by the appended claims.

In various embodiments of the present disclosure, expressions such as "comprise," "include," or "may include" are used to specify the presence of disclosed functions, operations, or elements, but do not preclude the presence of one or more other functions, operations, or elements. In addition, it will be understood that terms such as "comprise," "include," or "have" when used herein, specify the presence of features, numbers, steps, operations, elements, components, or combinations thereof, but do not preclude the presence or addition of one or more other features, numbers, steps, operations, elements, components, or combinations thereof.

It will be understood that when a component is referred to as being "connected to and combined with" another component, the component can be directly connected or combined to the other component or intervening components may be present therebetween. On the other hand, it will be understood that when a component is referred to as being "directly connected to" or "directly combined with" another component, intervening components may not be present therebetween.

In the present disclosure, while such terms as "first," "second," etc., may be used to describe various components, such components must not be limited to the above terms. The above terms are used only to distinguish one component from another.

One or more embodiments relate to a steel cord for tire belt ply reinforcement, and related to a steel cord for tire belt ply reinforcement, the steel cord including a cord formed by periodically twisting n wires and rolled to manufacture wires having circular cross-sections and non-circular cross-sections, wherein the number of wires having circular cross-sections varies with the number of wires.

A steel cord according to an embodiment of the present disclosure may be used for reinforcing a tire belt ply of a vehicle, and may be used as other components when needed. Hereinafter, the present disclosure will be described in detail by explaining preferred embodiments of the present disclosure with reference to the attached drawings.

Figure 2:
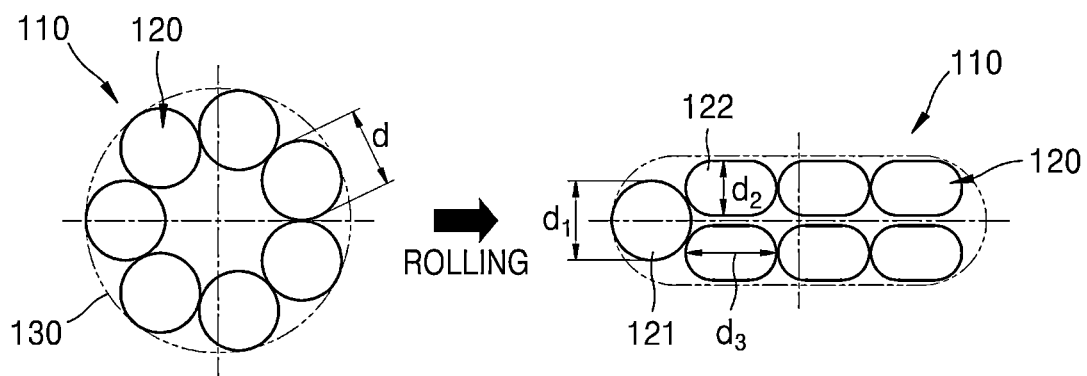
FIG. 2 is a diagram illustrating a steel cord rolled to have one circular cross-section when n is an odd number, according to an embodiment.

Referring to FIGS. 1 and 2, a steel cord for tire belt reinforcement according to an embodiment of the present disclosure includes a cord 110 formed by periodically twisting n wires 120.

The cord 110 is formed by periodically twisting n wires 120, and the number n of the wires 120 is preferably 3 to 9. The steel cord for tire belt ply reinforcement according to an embodiment of the present disclosure may be manufactured by rolling the cord 110 formed by periodically twisting n wires 120.

The n wires 120, before being rolled, may be arranged in a virtual first circle 130 that the n wires 120 contact. As shown in FIGS. 1 and 2, rolling is performed after the n wires 120 are arranged in the virtual first circle 130 that the n wires 120 contact at the same time.

When the n wires 120 are compressed by the rolling, and at least one of the n wires 120 is compressed into a non-circular shape.

As shown in FIG. 1, when n is an even number (n=4, 6, 8, 10), by rolling, cross-sections of two wires from among the n wires 120 may be circular, and cross-sections of n−2 wires from among the n wires 120 may be non-circular. As shown in FIG. 2, when n is an odd number (n=3, 5, 7, 9, 11), by rolling, a cross-section of one wire from among the n wires 120 may be circular, and cross-sections of n−1 wires from among the n wires 120 may be non-circular. Herein, a non-circular cross-section may include an elliptical shape which is symmetrical or asymmetrical.

A steel cord for tire belt ply reinforcement of a vehicle should have a uniform distances between cords without overlapping the cords so as to reduce the rolling resistance of a tire. To this end, it is preferable that the cords uniformly extend in a certain direction.

As described above, before being rolled, the n wires 120 may be arranged in the virtual first circle 130, and a direction in which rolling may be performed outside the virtual first circle 130 may be indicated by various points. However, when rolling is performed in a wrong direction, the cords may not uniformly extend in a certain direction while the direction of cords is dislocated.

In the steel cord for tire belt ply reinforcement according to an embodiment of the present disclosure, the cord 110 may be manufactured to extend uniformly in a certain direction as a direction of rolling is determined in a desired direction, when rolling is performed on the cord 110 formed by periodically twisting the n wires 120.

In detail, according to an embodiment of the present disclosure, when n is an even number (n=4, 6, 8, 10), the direction of rolling is determined such that the cross-sections of two wires from among the n wires 120 maintain a circular shape while other wires have a non-circular cross-section, and when n is an odd number (n=3 5, 7, 9, 11), the direction of rolling is determined such that a cross-section of one wire from among the n wires 120 maintains a circular shape while other wires have a non-circular cross-section.

When the direction of rolling is determined in the above method, cords which uniformly extend in a certain direction may be manufactured, and thus, overlapping of the cords may be prevented and distances between the cords may be uniform.

According to an embodiment of the present disclosure, a rolling strength when rolling is performed may be adjusted through a ratio of a diameter of a wire having a circular cross-section to a minor axis of a wire having a non-circular cross-section. When a wire of which a cross-section is circular due to the rolling is referred to as a first wire 121, and a wire of which a cross-section is non-circular due to the rolling is referred to as a second wire 122, a ratio of a minor axis $d_2$ of the second wire 122 to a diameter $d_1$ of the first wire 121 is preferably about 0.70 to about 0.98 ($0.70 \leq d_2/d_1 \leq 0.98$).

Figure 3:
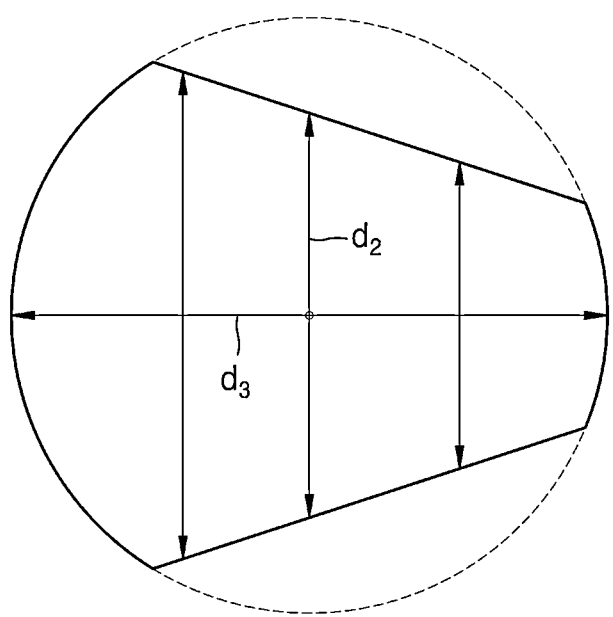
FIG. 3 is a diagram illustrating a minor axis according to an embodiment.

Herein, the minor axis $d_2$ of the second wire 122 may have a length shown in FIGS. 1 and 2. However, when a non-circular cross-section of the second wire 122 is not formed in an elliptical shape as shown in FIG. 3, the minor axis $d_2$ of the second wire 122 may be defined as a shortest distance of the non-circular cross section from among distances passing through the center of a circle having a major axis $d_3$ as a diameter and extending from one side to the other side.

When the ratio of the minor axis $d_2$ of the second wire 122 to the diameter $d_1$ of the first wire 121 is too small (when a $da/d_1$ value is less than 0.70), disconnection occurs as the rolling strength is too strong. In addition, when the second wire 122 is compressed too much, rubber penetrability thereof may decrease as a space through which rubber may penetrate becomes insufficient, and thus, a fatigue property may decrease.

On the other hand, when the ratio of the minor axis $d_2$ to the diameter $d_1$ of the first wire 121 is too large (when the $d_2/d_1$ value is greater than 0.98), an effect of rolling may not be obtained as expected, a possibility of moisture penetration may increase as a gap between wires becomes wider, and durability and fatigue properties may decrease.

Figure 4:
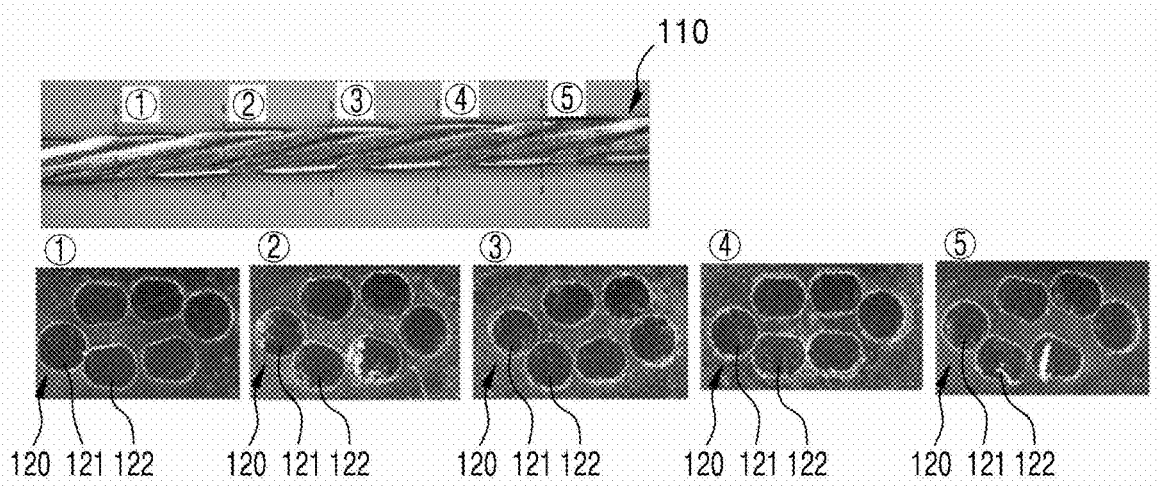
FIG. 4 is a diagram illustrating a first wire and a second wire when n is 6, according to an embodiment.

FIG. 4 is a photograph showing that two wires have a circular cross-section and four wires have a non-circular cross-section when n is an even number and a value of n is 6, according to an embodiment. Hereinafter, effects of an initial adhesion strength and a fatigue cycle will be described below by comparing an embodiment of the present disclosure and a Comparative Example.

FIGS. 5 to 10 shows comparisons of an initial adhesion strength and a fatigue cycle of an embodiment of the present disclosure and a Comparative Example, according to a ratio of the value of the minor axis $d_2$ of the second wire 122 to the diameter $d_1$ of the first wire 121.

FIG. 5 shows, when n is an odd number, conditions of Comparative Examples 1, 2, and 3, in which the ratio of the minor axis $d_2$ of the second wire 122 to the diameter $d_1$ of the first wire 121 is out of a range of about 0.70 to about 0.98, and conditions of Embodiments 1, 2, and 3, in which the ratio of the minor axis $d_2$ of the second wire 122 to the diameter $d_1$ of the first wire 121 is within the range of about 0.70 to about 0.98.

Figure 6:
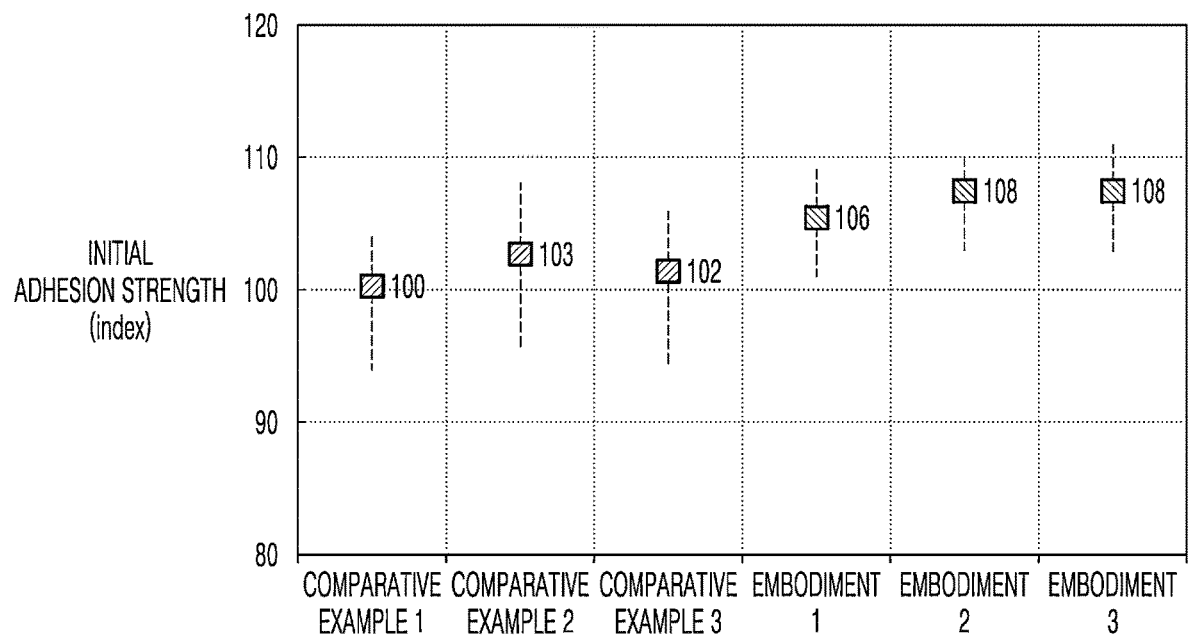
FIG. 6 is a diagram illustrating a comparison of an initial adhesion strength of the Comparative Examples 1, 2, and 3, and Embodiments 1, 2, and 3 of FIG. 5.
Figure 7:
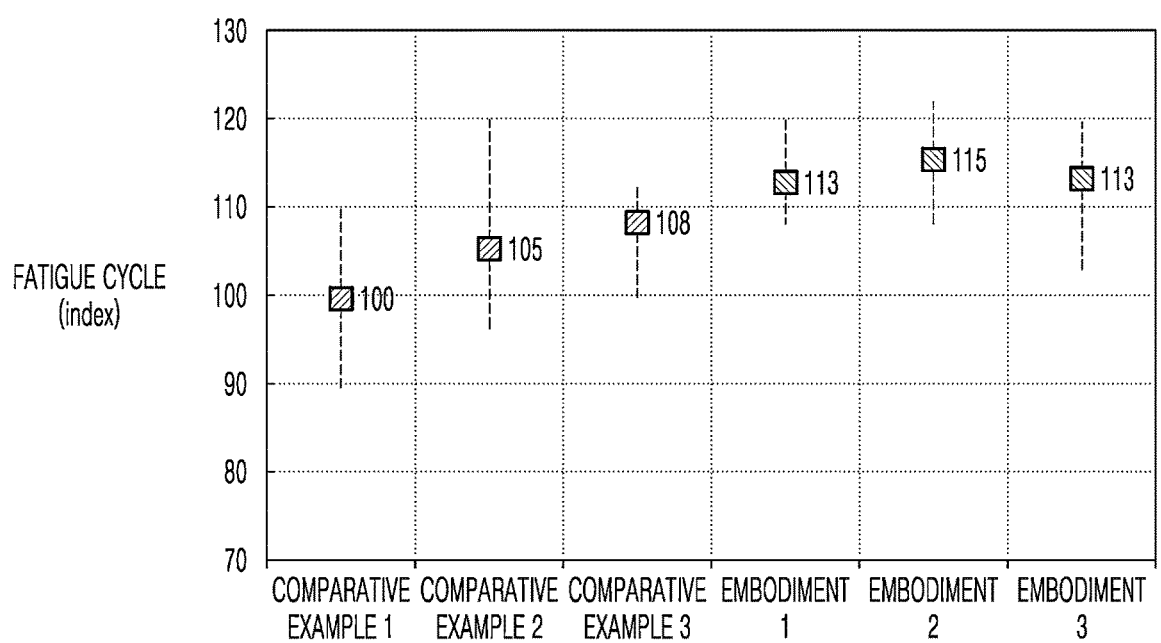
FIG. 7 is a diagram illustrating a comparison of a fatigue cycle of the Comparative Examples 1, 2, and 3, and Embodiments 1, 2, and 3 of FIG. 5.

FIG. 6 is a diagram illustrating a comparison of an initial adhesion strength of the Comparative Examples 1, 2, and 3, and Embodiments 1, 2, and 3 of FIG. 5, and FIG. 7 is a diagram illustrating a comparison of a fatigue cycle of the Comparative Examples 1, 2, and 3, and Embodiments 1, 2, and 3 of FIG. 5.

FIG. 8 shows, when n is an even number, conditions of Comparative Examples 1, 2, and 3, in which the ratio of the minor axis $d_2$ of the second wire 122 to the diameter $d_1$ of the first wire 121 is out of the range of about 0.70 to about 0.98, and conditions of Embodiments 1, 2, and 3, in which the ratio of the minor axis $d_2$ of the second wire 122 to the diameter $d_1$ of the first wire 121 is within the range of about 0.70 to about 0.98.

Figure 9:
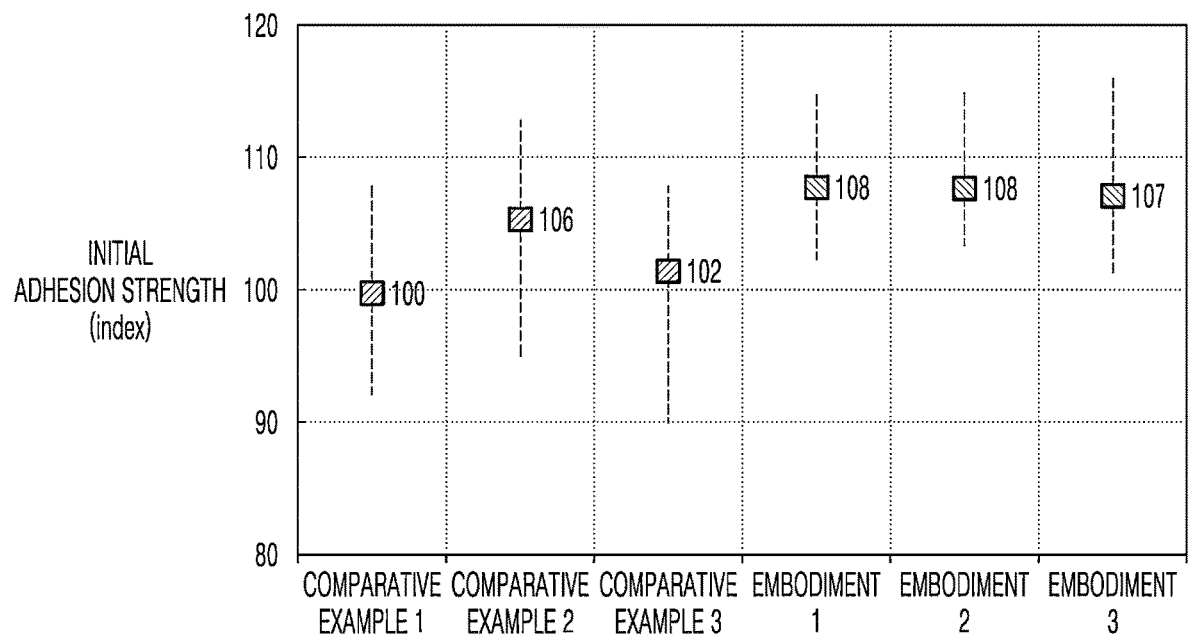
FIG. 9 is a diagram illustrating a comparison of an initial adhesion strength of the Comparative Examples 1, 2, and 3, and Embodiments 1, 2, and 3 of FIG. 8.
Figure 10:
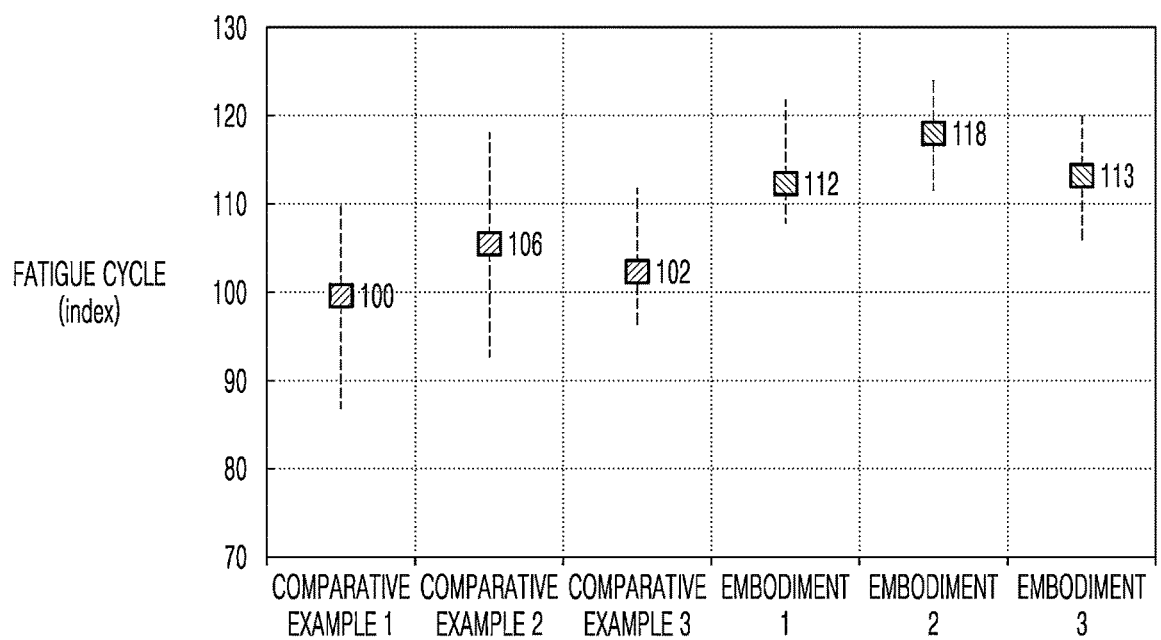
FIG. 10 is a diagram illustrating a comparison of a fatigue cycle of the Comparative Examples 1, 2, and 3, and Embodiments 1, 2, and 3 of FIG. 8.

FIG. 9 is a diagram illustrating a comparison of an initial adhesion strength of the Comparative Examples 1, 2, and 3, and Embodiments 1, 2, and 3 of FIG. 8, and FIG. 10 is a diagram illustrating a comparison of a fatigue cycle of the Comparative Examples 1, 2, and 3, and Embodiments 1, 2, and 3 of FIG. 8.

In FIGS. 5 to 10, in the case of Comparative Example 2, as the ratio of the minor axis $d_2$ of the second wire 122 to the diameter $d_1$ of the first wire 121 is less than 0.70, an initial adhesion strength and a fatigue property decrease. The Comparative Example 2 shows that when the second wire 122 is compressed too much, the rubber penetrability thereof may decrease as a space through which rubber may penetrate becomes insufficient, and thus, the fatigue property may decrease.

In addition, in FIGS. 5 to 10, as in Comparative Example 2, when the ratio of the minor axis $d_2$ of the second wire 122 to the diameter $d_1$ of the first wire 121 is less than 0.70, disconnection may occur in a manufacturing operation.

Regarding FIGS. 5 to 10, in the case of Comparative Example 3, the initial adhesion strength and the fatigue property decrease as the ratio of the minor axis $d_2$ of the second wire 122 to the diameter $d_1$ of the first wire 121 is greater than 0.98, and also a stiffness coefficient of a major axis $d_3$ does not increase.

When the ratio of the minor axis $d_2$ of the second wire 122 to the diameter $d_1$ of the first wire 121 is greater than 0.98, an effect of rolling may not be obtained as expected, and when the ratio of the minor axis $d_2$ of the second wire 122 to the diameter $d_1$ of the first wire 121 is greater than 0.98, stiffness may not be increased in a direction of a rotation axis, and the durability thereof may not be improved.

In addition, when the ratio of the minor axis $d_2$ of the second wire 122 to the diameter $d_1$ of the first wire 121 is greater than 0.98, the possibility of moisture penetration increases as a gap between wires increases, and thus, the durability and the fatigue property decrease, and when the ratio of the minor axis $d_2$ of the second wire 122 to the diameter $d_1$ of the first wire 121 is greater than 0.98, an effect of reducing the thickness of rubber may not be obtained when a steel cord is buried in a rubber sheet.

Referring to FIGS. 5 to 10, according to an embodiment of the present disclosure, when rolling is performed such that the ratio of the minor axis $d_2$ of the second wire 122 to the diameter $d_1$ of the first wire 121 is about 0.70 to about 0.98, the initial adhesion strength is improved, the fatigue property is improved, and the stiffness coefficient of the major axis $d_3$ is also increased, as compared with the Comparative Examples 1, 2, and 3.

According to an embodiment of the present disclosure, when rolling is performed such that the ratio of the minor axis $d_2$ of the second wire 122 to the diameter $d_1$ of the first wire 121 is about 0.70 to about 0.98, the initial adhesion strength of a steel cord may be improved while a decrease in the durability of the steel cord due to the penetration of moisture or salt may be prevented due to improving the rubber penetrability.

In addition, according to an embodiment of the present disclosure, when rolling is performed such that the ratio of the minor axis $d_2$ of the second wire 122 to the diameter $d_1$ of the first wire 121 is about 0.70 to about 0.98, the durability and the fatigue property of the steel cord may be improved as the stiffness in the direction of the rotation axis of a tire is increased (increasing the stiffness coefficient of major axis $d_3$), and the thickness of the rubber may be reduced without decreasing the stiffness compared to a circular steel cord when burying the steel cord in a rubber sheet.

Accordingly, according to an embodiment of the present disclosure, it is preferable that the value of the minor axis $d_2$ of the second wire 122 with respect to the diameter $d_1$ of the first wire 121 is about 0.70 to about 0.98.

According to an embodiment of the present disclosure, rolling may be performed such that a tensile strength of the wire 120 may be different before and after the rolling. When a diameter of the wire 120 before the rolling is referred to as d (mm), a first strength (normal tensile, NT) may be defined as 3,200–2,000×d (mm)+200 (MPa), a second strength (high tensile, HT) may be defined as 3,500–2,000×d (mm)+200 (MPa), a third strength (super tensile, ST) may be defined as 3,850–2,000×d (mm)+200 (MPa), a fourth strength (ultra tensile, UT) may be defined as 4,200–2,000×d (mm)+200 (MPa), and a fifth strength (mega tensile. MT) may be defined as 4,600–2,000×d (mm)+200 (MPa). Herein, the diameter d of the wire 120 is a certain diameter of a wire before rolling, and may be the same as the diameter $d_1$ of the first wire 121.

A tensile strength of the wire 120 before rolling may have at least one of the first strength (NT), the second strength (HT), the third strength (ST), the fourth strength (UT), and the fifth strength (MT). The tensile strength of the wire 120 before rolling may be changed according to the tensile strength required for a steel cord.

According to an embodiment of the present disclosure, rolling may be performed such that the tensile strength of the wire 120 is changed. In detail, the rolling may be performed such that the tensile strength of the wire 120 may be lowered, and the wire 120 having a tensile strength of an n-th strength before the rolling may be rolled to have a tensile of an n−1-th strength by the rolling. (Herein, n may be a value of n=2, 3, 4, and 5.)

In detail, when the tensile strength of the wire 120 before the rolling was the fifth strength (MT), the tensile strength of the wire 120 after rolling may be the fourth strength (UT), and when the tensile strength of the wire 120 before the rolling was the fourth strength (UT), the tensile strength of the wire 120 after rolling may be the third strength (ST).

As described above, the rolling according to an embodiment of the present disclosure may be performed in a direction in which the tensile strength of the wire 120 is changed. When the rolling is performed, physical properties of a wire may be changed as the wire is compressed. When rolling is performed without considering the above part, a tensile strength of a steel cord to be finally manufactured may not be accurately known.

In a steel cord for tire belt ply reinforcement according to an embodiment of the present disclosure, physical properties (a tensile strength) of a wire changed by rolling is changed at a specified value.

The steel cord for tire belt ply reinforcement according to an embodiment of the present disclosure is rolled to have a tensile strength of the n−1-th strength by rolling the wires 120 having a tensile strength of the n-th strength before rolling, and a tensile strength of a finally manufactured steel cord may be accurately known as the rolling is performed such that the tensile strength changes to be the specified value.

At this time, because a degree of change in the tensile strength of the wires 120 may vary depending on the diameter of the wires 120, the first strength (NT), the second strength (HT), the third strength (ST), the fourth strength (UT), the fifth strength (MT) may be determined according to a ratio with respect to the diameter d of the wires 120.

Herein, the wires 120 whose tensile strength is changed by rolling may be the second wire 122 that is compressed during rolling. However, the present disclosure is not limited thereto, and the wires 120 of which the tensile strength is changed by rolling may be the first wire 121 and the second wire 122 when necessary.

A diameter of the first wire 121 of the steel cord for tire belt ply reinforcement according to an embodiment of the present disclosure may be about 0.1 mm to about 0.6 mm, but is not limited thereto and may be changed as needed.

The steel cord for tire belt ply reinforcement according to an embodiment of the present disclosure may have excellent straightness quality as the steel cord for tire belt ply reinforcement is manufactured through rolling.

In general, steel cords, which are tire reinforcements, take several months to be used in tires. That is, after being wound on a spool having a certain inner diameter, the steel cords are used several months later. Due to the properties of the steel cords used several months after being wound in this way, the linearity of a steel cord becomes an important property of the steel cord for tire reinforcement.

When the linearity is poor, an operation accuracy during manufacturing a tire is affected, and buckling and tip rising phenomena are caused, which may cause problems during rolling and cutting operations.

An excellent straightness quality means that when one end of the steel cord is fixed to one point when being wound on a spool for two months to one year and when the steel cord is lower vertically by 400 mm, as the distance between a first axis forming a vertical line from the one point and the other end of the steel cord becomes smaller, the straightness quality become better.

The steel cord for tire belt ply reinforcement according to an embodiment of the present disclosure may also have excellent straightness quality as the steel cord for tire belt ply reinforcement is manufactured through the rolling.

In detail, when the one end of the steel cord for tire belt ply reinforcement according to an embodiment of the present disclosure is fixed to one point when being wound on the spool for two months to one year and when the steel cord is vertically lowered by 400 mm, the distance between the first axis forming the vertical line from the one point and the other end of the steel cord may be 40 mm or less.

FIG. 11 shows a comparison of straightness quality of embodiments of the present disclosure and Comparative Examples according to a ratio of a value of the minor axis $d_2$ of the second wire 122 to the diameter $d_1$ of the first wire 121. FIG. 11 shows, when one end of the steel cord is fixed to one point when the steel cord is wound on a spool for two months to one year and when the steel cord is vertically lowered by 400 mm, a distance between a first axis forming a vertical line from the one point and the other end of the steel cord.

FIG. 11 shows straightness quality with respect to Comparative Examples 1 and 2, in which the ratio of the minor axis $d_2$ of the second wire 122 to the diameter $d_1$ of the first wire 121 is out of a range of about 0.70 to about 0.98, and Embodiments 1, 2, 3, and 4, in which the ratio of the minor axis $d_2$ of the second wire 122 to the diameter $d_1$ of the first wire 121 is within the range of about 0.70 to about 0.98.

Referring to FIG. 11, when a steel cord is manufactured through rolling according to an embodiment of the present disclosure, it can be seen that the linearity of the steel cord is excellent even after time passes as the residual stress of the steel cord is removed.

At this time, the steel cord for tire belt ply reinforcement according to an embodiment of the present disclosure may be heat-treated at about 100° C. to about 250° C. Referring to FIG. 11, when the cord 110 is rolled in a range in which the ratio of the minor axis $d_2$ of the second wire 122 $t$ to the diameter $d_1$ of the first wire 121 is about 0.70 to about 0.98 and is heat-treated at a low temperature of about 100° C. to about 250° C., the straightness quality is further improved.

In detail, in Embodiments 2 and 4 of FIG. 11, the cord 110 is subjected to a low-temperature heat treatment, and Embodiments 2 and 4 may have improved straightness quality compared to Comparative Examples 1 and 2 and Embodiments 1 and 3. As described above, when the steel cord is subject to the low-temperature heat treatment while being rolled according to an embodiment of the present disclosure, a steel cord having excellent straightness quality may be manufactured.

The steel cord for tire belt ply reinforcement according to an embodiment of the present disclosure described above has the following effects.

The steel cord for tire belt ply reinforcement according to an embodiment of the present disclosure may increase stiffness in a direction of a rotation axis of a tire as the steel cord is manufactured through rolling, thereby improving the durability and fatigue property of the steel cord.

In addition, the steel cord for tire belt ply reinforcement according to an embodiment of the disclosure may prevent a decrease in the durability of the steel cord due to penetration of moisture or salt by improving the rubber penetrability, and may improve the initial adhesion strength and fatigue property of the steel cord by improving the rubber penetrability.

In addition, the steel cord for tire belt ply reinforcement according to an embodiment of the present disclosure may reduce the thickness of rubber when the steel cord is buried in a rubber sheet as the steel cord is manufactured through rolling, and the steel cord for tire belt ply reinforcement according to an embodiment of the present disclosure may improve the straightness quality through rolling.

In particular, when the tensile strength thereof after rolling is the n-th strength, the steel cord for tire belt ply reinforcement according to an embodiment of the present disclosure has a tensile strength as an n+1-th strength before rolling, thereby reducing the thickness of rubber when the steel cord is buried in the rubber sheet without a decrease in the strength as compared with a circular steel cord.

In addition, in the steel cord for tire belt ply reinforcement according to an embodiment of the present disclosure, a steel cord may be manufactured while preventing disconnection from occurring and a decrease in the durability and fatigue property of the steel cord due to a decrease in rubber penetration and penetration of moisture or salt, as the ratio of the minor axis $d_2$ of the second wire 122 to the diameter $d_1$ of the first wire 121 is specified in the range of about 0.70 to about 0.98 and performing rolling.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

The invention claimed is:

1. A steel cord for tire belt ply reinforcement of a vehicle, the steel cord comprising:
   a cord formed by periodically twisting n wires,
   wherein the n wires are compressed by rolling, and at least one of the n wires is compressed into a non-circular shape,
   when n is an odd number, a cross-section of one wire from among the n wires is circular due to the rolling, and cross-sections of n−1 wires from among the n wires are non-circular, and
   when n is an even number, cross-sections of two wires from among the n wires are circular due to the rolling, and cross-sections of n−2 wires from among the n wires are non-circular due to the rolling,
   wherein, when a wire of which a cross-section is circular due to the rolling is referred to as a first wire, a wire of which a cross-section is non-circular due to the rolling is referred to as a second wire,
   a ratio of a minor axis of the second wire to a diameter of the first wire is about 0.70 to about 0.98,
   wherein, when a diameter of the wires before the rolling is referred to as d (mm),
   a first strength (normal tensile, NT) is defined as 3,200-2,000×d (mm)+200 (MPa),
   a second strength (high tensile, HT) is defined as 3,500-2,000×d (mm)+200 (MPa),
   a third strength (super tensile, ST) is defined as 3,850-2,000×d (mm)+200 (MPa),
   a fourth strength (ultra tensile, UT) is defined as 4,200-2,000×d (mm)+200 (MPa),
   a fifth strength (mega tensile, MT) is defined as 4,600-2,000×d (mm)+200 (MPa), and
   a tensile strength of the second wires before the rolling is one of the second strength, the third strength, the fourth strength, and the fifth strength, and wherein, the second wires having a tensile strength of an n-th strength before the rolling are rolled to have a tensile strength of an n−1-th strength.

2. The steel cord of claim 1, wherein the number (n) of the wires is 3 to 9.

3. The steel cord of claim 1, wherein the diameter of the first wire is about 0.1 mm to about 0.6 mm.

* * * * *